United States Patent
Huang

(10) Patent No.: US 8,870,380 B2
(45) Date of Patent: Oct. 28, 2014

(54) SYSTEM AND METHOD FOR TIME-MULTIPLEXED AUTOSTEREOSCOPIC DISPLAY

(71) Applicant: Delta Electronics, Inc., Taoyuan Hsien (TW)

(72) Inventor: Junejei Huang, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 13/718,157

(22) Filed: Dec. 18, 2012

(65) Prior Publication Data

US 2014/0071352 A1    Mar. 13, 2014

(30) Foreign Application Priority Data

Sep. 11, 2012 (TW) ............... 101133080 A

(51) Int. Cl.
*G03B 21/00* (2006.01)
*G02B 27/22* (2006.01)
*G02F 1/13* (2006.01)
*G02B 26/08* (2006.01)

(52) U.S. Cl.
CPC .......... *G02B 27/225* (2013.01); *G02B 27/2264* (2013.01); *G02F 1/1313* (2013.01); *G02B 26/0833* (2013.01)
USPC ........ 353/7; 353/30; 353/31; 353/38; 353/94; 353/99; 349/5; 349/9

(58) Field of Classification Search
USPC .................. 353/7, 30, 31, 32, 37, 38, 88, 94, 353/98–99; 349/5, 7–9, 15; 359/242, 256, 359/259, 263, 376, 378, 464, 466; 348/51, 348/743–747, E13.027, E13.059
See application file for complete search history.

(56) References Cited

U.S. PATENT DOCUMENTS

| 6,118,584 | A | 9/2000 | Van Berkel et al. |
| 6,533,420 | B1 * | 3/2003 | Eichenlaub ....................... 353/7 |
| 6,595,648 | B1 * | 7/2003 | Woodgate et al. ............. 353/122 |
| 6,788,274 | B2 * | 9/2004 | Kakeya ............................ 345/7 |
| 7,058,252 | B2 * | 6/2006 | Woodgate et al. .............. 385/16 |
| 7,450,188 | B2 * | 11/2008 | Schwerdtner ................... 349/15 |

(Continued)

FOREIGN PATENT DOCUMENTS

| EP | 0970589 B1 | 8/2004 |
| WO | 2012/151722 A1 | 11/2012 |

OTHER PUBLICATIONS

Taiwan Office Action of Patent Application No. 101133080 dated on Jul. 4, 2014, with English Summary.

*Primary Examiner* — Sultan Chowdhury
(74) *Attorney, Agent, or Firm* — Cantor Colburn LLP

(57) ABSTRACT

A system and a method for time-multiplexed autostereoscopic display are disclosed, wherein the system includes a projector, an optical relaying device and a slit array. The projector can project a plurality of rays of different directions in different time sequences respectively. The optical relaying device is optically coupled with the projector for relaying the rays. The slit array is optically coupled with the optical relaying device for being illuminated by the rays. The slit array further has a plurality of regions which are illuminated by the rays respectively; and each of the regions has a plurality of slits which are turned on sequentially for a part of the rays to pass therethrough. Therefore, the display system can reduce the light loss of the rays each time when a 3D virtual image is formed.

12 Claims, 14 Drawing Sheets

(56) References Cited

U.S. PATENT DOCUMENTS

| | | |
|---|---|---|
| 7,626,643 B2 | 12/2009 | Ijzerman et al. |
| 7,688,376 B2 * | 3/2010 | Kondo et al. ............. 348/340 |
| 7,986,375 B2 | 7/2011 | Krijn et al. |
| 2006/0244918 A1 * | 11/2006 | Cossairt et al. ............. 353/7 |
| 2007/0165304 A1 * | 7/2007 | Tomita ............. 359/464 |
| 2007/0229778 A1 * | 10/2007 | Cha et al. ............. 353/94 |

\* cited by examiner

SYSTEM AND METHOD FOR TIME-MULTIPLEXED AUTOSTEREOSCOPIC DISPLAY

CROSS-REFERENCES TO RELATED APPLICATIONS

This application claims priority to Taiwan Patent Application No. 101133080 filed on Sep. 11, 2012, which is hereby incorporated herein by reference in its entirety.

BACKGROUND OF THE INVENTION

1. Field of the Invention

The present invention provides a system and method for stereoscopic display, and more particularly, a system and method for time-multiplexed autostereoscopic display.

2. Descriptions of the Related Art

Stereoscopic display has become a hot topic of research in recent years. The primary principles of a stereoscopic display are as follows: a display device feeds images, which presents different viewing angles for the left eye and the right eye and results in an image with depth in viewer's brain when the two images with the same image contents but different parallaxes are viewed by the two eyes respectively. Thus, the resulting image is perceived to be stereoscopic.

There are various technologies based on the aforesaid principles of the stereoscopic display, one of which is called a "system for time-multiplexed autostereoscopic display".

With reference to FIG. 1, the "system for time-multiplexed autostereoscopic display" was invented by Professor Adrian Travis of Cambridge University. The display system 9 has a cathode ray tube (CRT) 91, two lenses 92 and a shutter or slit array 93.

The CRT 91 can project a ray (image), which is then transmitted through the lenses 92 to impinge on the slit array 93. The slit array 93 has a plurality of slits 931, which can be turned on sequentially, but not simultaneously. In more detail, at a specific time point, only one slit 931A of the slits 931 is turned on while the other slits 931B are turned off.

Although the ray impinges on all the slits 931 of the slit array 93, only a small part of the ray can pass through the only turned-on slit 931A while the other part of the ray is blocked by the slits 931B that are turned off. The CRT 91 adjusts the intensity of the ray projected by each pixel thereof according to different positions of the turned-on slit 931A (i.e., the CRT 91 adjusts the displayed image). Therefore, when the slits 931 are turned on in turn, each pixel of the CRT 91 will emit rays of different intensities and different directions outwards from the slit array 93.

By emitting the rays of different intensities and different directions, the display system 9 can simulate a light, which appears to be emitted by an object in the space, to form a three-dimensional (3D) virtual image of the object that can be viewed by a viewer 94 positioned in front of the slit array 93.

The system for time-multiplexed autostereoscopic display may be applied in medical treatments so that medical workers can observe 3D images of patients' organs through the display system. The system for time-multiplexed autostereoscopic display may also be applied in video communication so that the 3D images of both parties can be seen by each other.

However, a problem with the system for time-multiplexed autostereoscopic display is that "the 3D image outputted has an insufficient brightness". The reason is as follows: at each time point, only a small part of the ray generated by the CRT can pass through the only turned-on slit while a major part of the ray is blocked by the slit array. If the slit array has one hundred slits, then only one hundredth (i.e. 1%) of the ray can be outputted by the display system each time while ninety-nine hundredths (i.e. 99%) of the ray is wasted.

Another problem with the system for time-multiplexed autostereoscopic display is the requirement of particularly high frame rate. The reason is as follows: to prevent the viewer who is viewing the 3D image from perceiving the flickering of the 3D image, the display system needs to output at least sixty 3D images within a second; however, the CRT needs to output the same number of display images as that of the slits each time when one 3D image is outputted, so the images of at least "sixty times the number of the slits" must be generated by the CRT within a second.

If the number of the slits is one hundred, then the CRT needs to generate at least six thousand images within a second and each of the slits is tuned on for only one six-thousandth (i.e. $\frac{1}{6000}$) second before being turned off. This has a great influence on the service lives of both the CRT and the slits.

Accordingly, an urgent need exists in the art to provide a system or method for a time-multiplexed autostereoscopic display which can improve at least one of the aforesaid shortcomings.

SUMMARY OF THE INVENTION

An objective of the present invention is to provide a system or method for time-multiplexed autostereoscopic display, which can reduce the light loss when a 3D image is outputted.

Another objective of the present invention is to provide another system or method for time-multiplexed autostereoscopic display, which can reduce the required frame rate.

To achieve one of the aforesaid objectives, the present invention discloses a system for time-multiplexed autostereoscopic display, which comprises: at least one projector having a plurality of light sources, wherein the light sources are adapted to be turned on sequentially so that the projector projects a plurality of rays of different directions in different time sequences respectively; an optical relaying device, optically coupled with the projector for relaying the rays; and a slit array, optically coupled with the optical relaying device to be illuminated by the rays, wherein the slit array has a plurality of adjacent regions that are illuminated by the rays respectively. Each of the regions has a plurality of slits which are turned on sequentially for a part of the rays to pass therethrough; wherein, a number of the light sources corresponds to a number of the regions. Each of the light sources has a first turn-on period, while each of the slits has a second turn-on period which is smaller than the first turn-on period.

To achieve one of the aforesaid objectives, the present invention discloses a method for time-multiplexed autostereoscopic display, which comprises: turning on a plurality of light sources of at least one projector sequentially so that the projector projects a plurality of rays of different directions in different time sequences respectively to an optical relaying device; transmitting the rays by the optical relaying device to a plurality of adjacent regions of a slit array respectively, wherein each of the regions has a plurality of slits; and turning on the slits sequentially for a part of the rays to pass therethrough; wherein, a number of the light sources corresponds to a number of the regions. Each of the light sources has a first turn-on period, while each of the slits has a second turn-on period which is smaller than the first turn-on period.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 2:
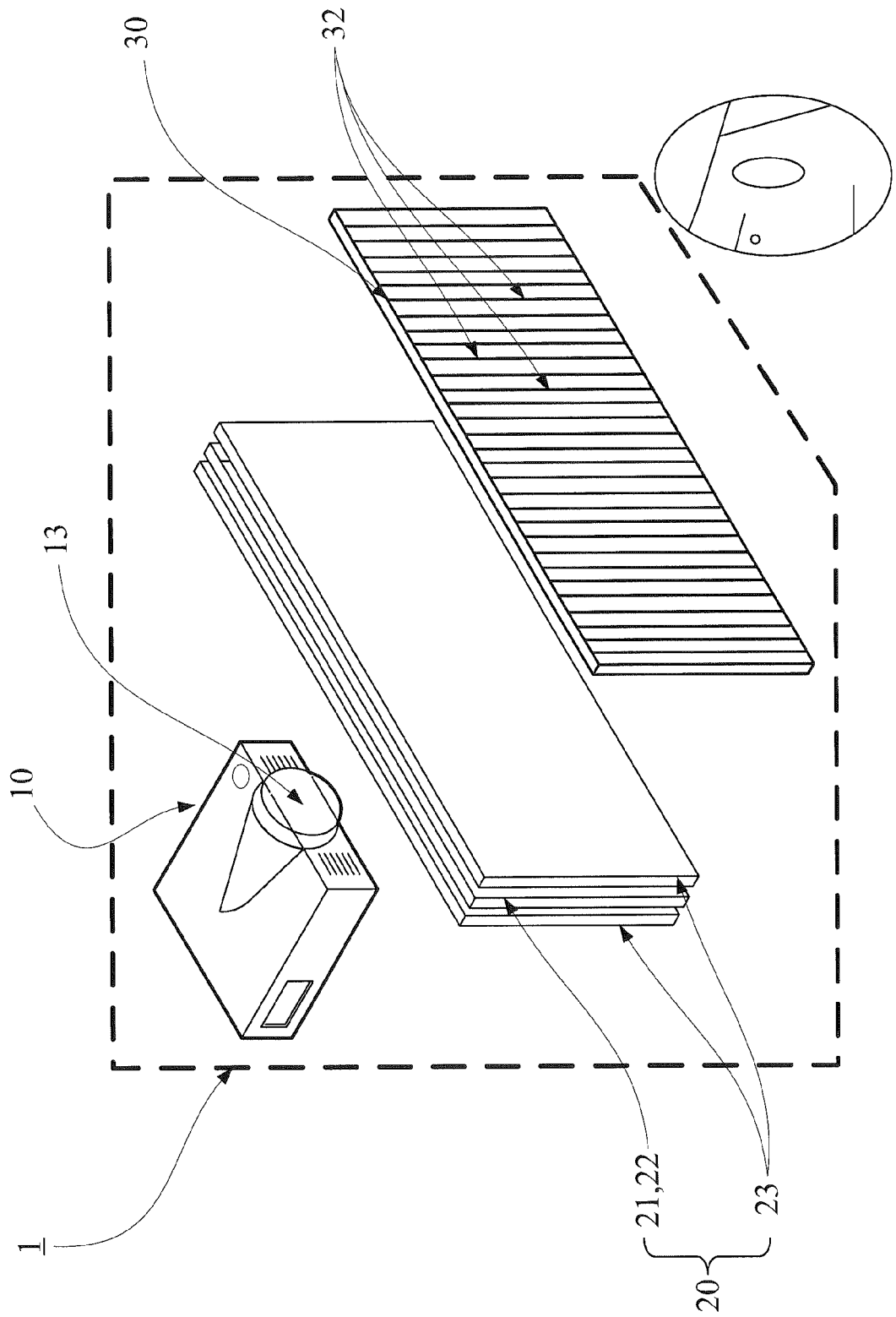
FIG. 2 is a schematic perspective view of a system for time-multiplexed autostereoscopic display according to the first embodiment of the present invention.
Figure 3:
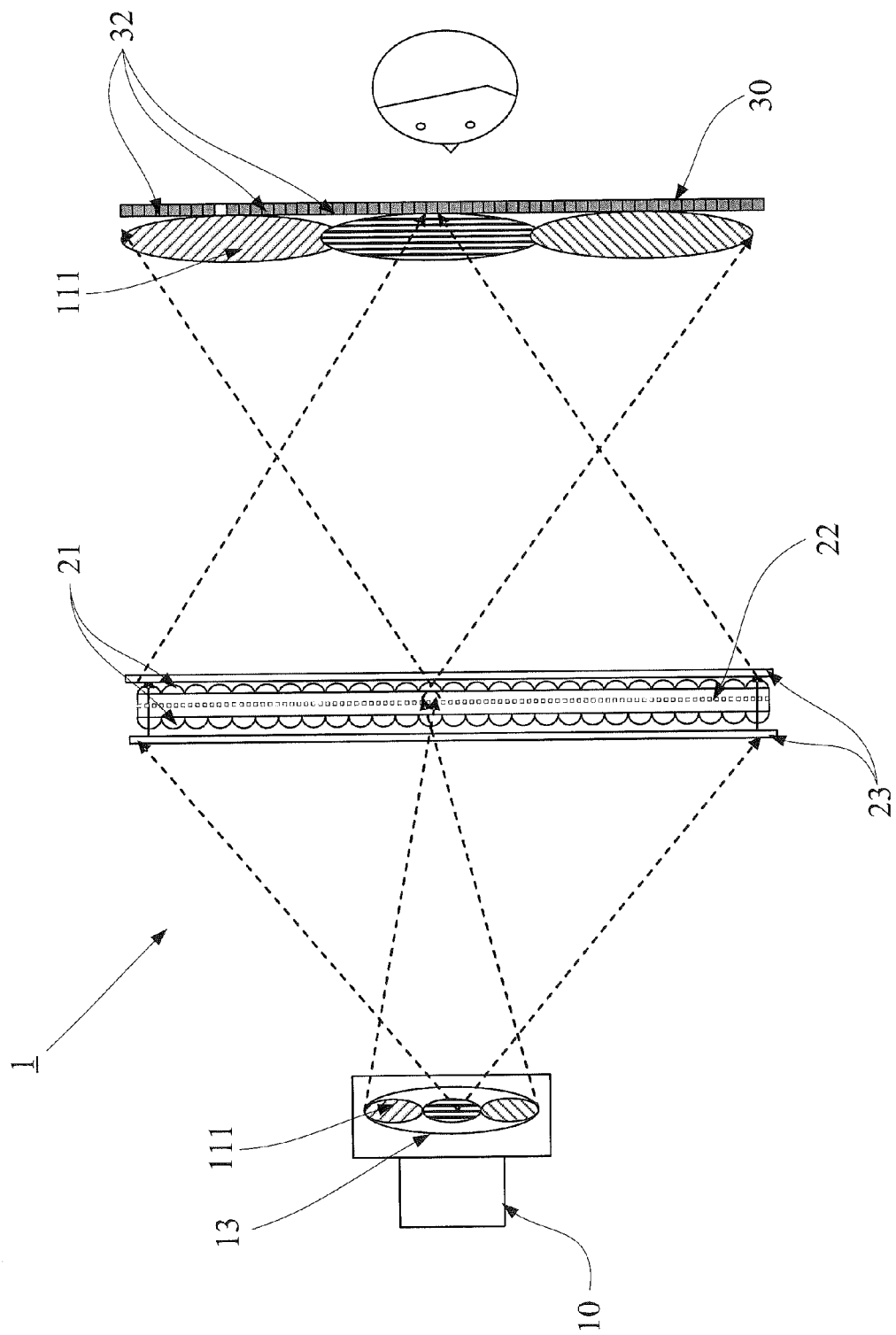
FIG. 3 is a schematic plan view of the system for time-multiplexed autostereoscopic display according to the first embodiment of the present invention.

FIGS. 2 and 3 illustrate a schematic perspective view and a schematic plan view of a system for time-multiplexed autostereoscopic display according to the first embodiment of the present invention, respectively. In the first embodiment of the present invention, a system 1 for time-multiplexed autostereoscopic display is provided. For simplicity of description, the system 1 for time-multiplexed autostereoscopic display will be referred to as the "display system 1" in the following descriptions.

The display system 1 may comprise at least one projector 10, an optical relaying device 20 and a slit array (or called as shutter) 30. The technical contents of these components will be sequentially described as follows.

Figure 4:
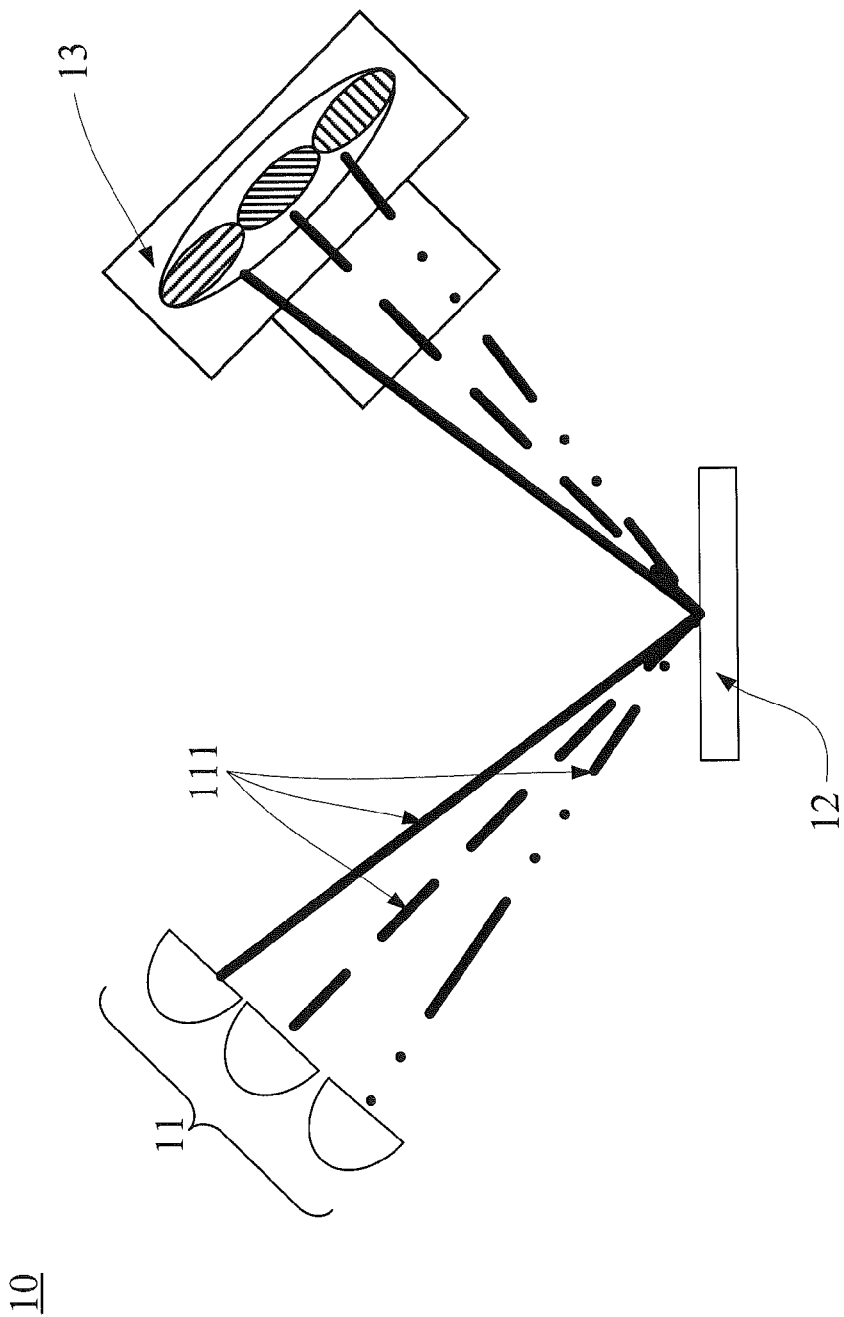
FIG. 4 is a schematic internal view of a projector of the display system shown in FIG. 3.

The term "at least one projector 10" means that there may be one or more projectors 10; however, only one projector 10 is illustrated as an example in this embodiment. FIG. 4 illustrates a schematic internal view of the projector of the display system shown in FIG. 3. The projector 10 may have a plurality of light sources 11, an optical modulator 12 and a projection lens 13. Three light sources 11 are illustrated as an example in this embodiment, and each of the light sources 11 can generate a ray 111.

When the display system 1 operates, the light sources 11 are turned on sequentially but not simultaneously. In other words, during a time period, only one of the light sources 11 is turned on to emit the ray 111. For example, in a time sequence from t1 to t2, only the first light source 11 is turned on; and in a time sequence from t2 to t3, only the second light source 11 is turned on. The light sources 11 may each be a solid-state light source (e.g., an LED light source or a laser light source) so that they can be turned on and turned off rapidly.

The optical modulator 12 is optically coupled with the light sources 11, and is also optically coupled with the projection lens 13. The term "optically coupled" generally refers to the case where rays are transmitted between two optical components, so the phrase "the optical modulator 12 is optically coupled with the light sources 11" means that the rays 111 generated by the light sources 11 can be transmitted to and impinge on the optical modulator 12.

The rays 111 generated by the light sources 11 impinge on the optical modulator 12 in different directions rather than in the same direction. In other words, each of the rays 111 propagates to the optical modulator 12 along a different main light path respectively. Furthermore, the rays 111 do not impinge on the optical modulator 12 simultaneously but impinge on the optical modulator 12 in sequence. In other words, the optical modulator 12 is illuminated by only one of the rays 111 in one time sequence.

After the rays 111 reach the optical modulator 12, the optical modulator 12 transforms the rays 111 into a plurality of images of different contents and then transmits the rays 111, which carry the images of different contents, to the projection lens 13. The optical modulator 12 is preferably a reflective optical modulator such as a DMD or an LCoS.

Because the rays 111 generated by the light sources 11 impinge on the optical modulator 12 in different directions, the optical modulator 12 transmits the rays 111 to the projection lens 13 in different directions; that is, the light sources 11 are imaged to different positions in the projection lens 13. Then, the projection lens 13 projects the rays 111 out of the projector 10 in different directions.

In conclusion, the light sources 11 of the projector 10 can be turned on sequentially so that the projector 10 can project the plurality of rays 111 of different directions in different time sequences respectively.

With reference to FIGS. 2 and 3 again, the optical relaying device 20 of the display system 1 is optically coupled with the projector 10 to receive, in different time sequences, the rays 111 projected by the projector 10 and then transmit the rays 111 to the slit array 30.

The optical relaying device 20 may consist of lenses. In this embodiment, the optical relaying device 20 preferably has two lenticular lens sheets 21, a diffuser 22 and two Fresnel lenses 23. The diffuser 22 is disposed between the two lenticular lens sheets 21, while the two lenticular lens sheets 21 are disposed between the two Fresnel lenses 23.

Figure 5:
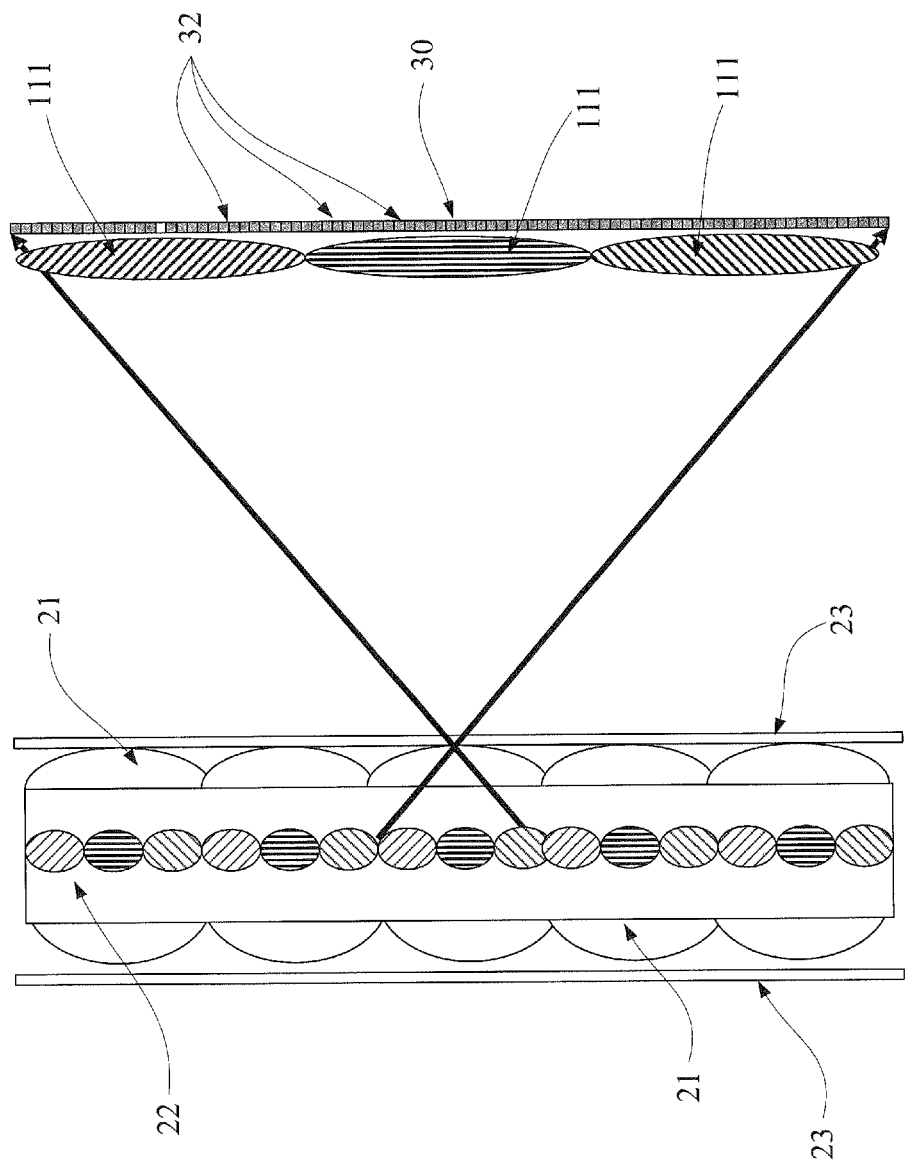
FIG. 5 is a schematic view of an optical relaying device and a slit array of the display system shown in FIG. 3.

FIG. 5 shows a schematic view of the optical relaying device and the slit array of the display system shown in FIG. 3. The Fresnel lens 23 that is closer to the projector 10 can collimate the rays 111, while the lenticular lens sheet 21 that is closer to the projector 10 can focus the collimated rays 111 onto the omnidirectional diffuser 22 so that the light sources 11 are imaged to the diffuser 22 through the lenticular lens sheet 21. The imaging positions of the light sources 11 in the diffuser 22 are different because the imaging positions of the light sources 11 in the projection lens 13 are different.

Then, the rays 111 are focused by the lenticular lens sheet 21, which is closer to the slit array 30, to the Fresnel lens 23 which is closer to the slit array 30, and are then collimated and transmitted by the Fresnel lens 23 to the slit array 30. In other words, the images of the light sources 11 in the diffuser 22 are further imaged to the slit array 30, and the imaging positions of the light sources 11 on the slit array 30 are different.

In conclusion, the optical relaying device 20 of the display system 1 can transmit the plurality of rays 111, which are projected by the projector 10, to the slit array 30 and to the different regions of the slit array 30.

Figure 6:
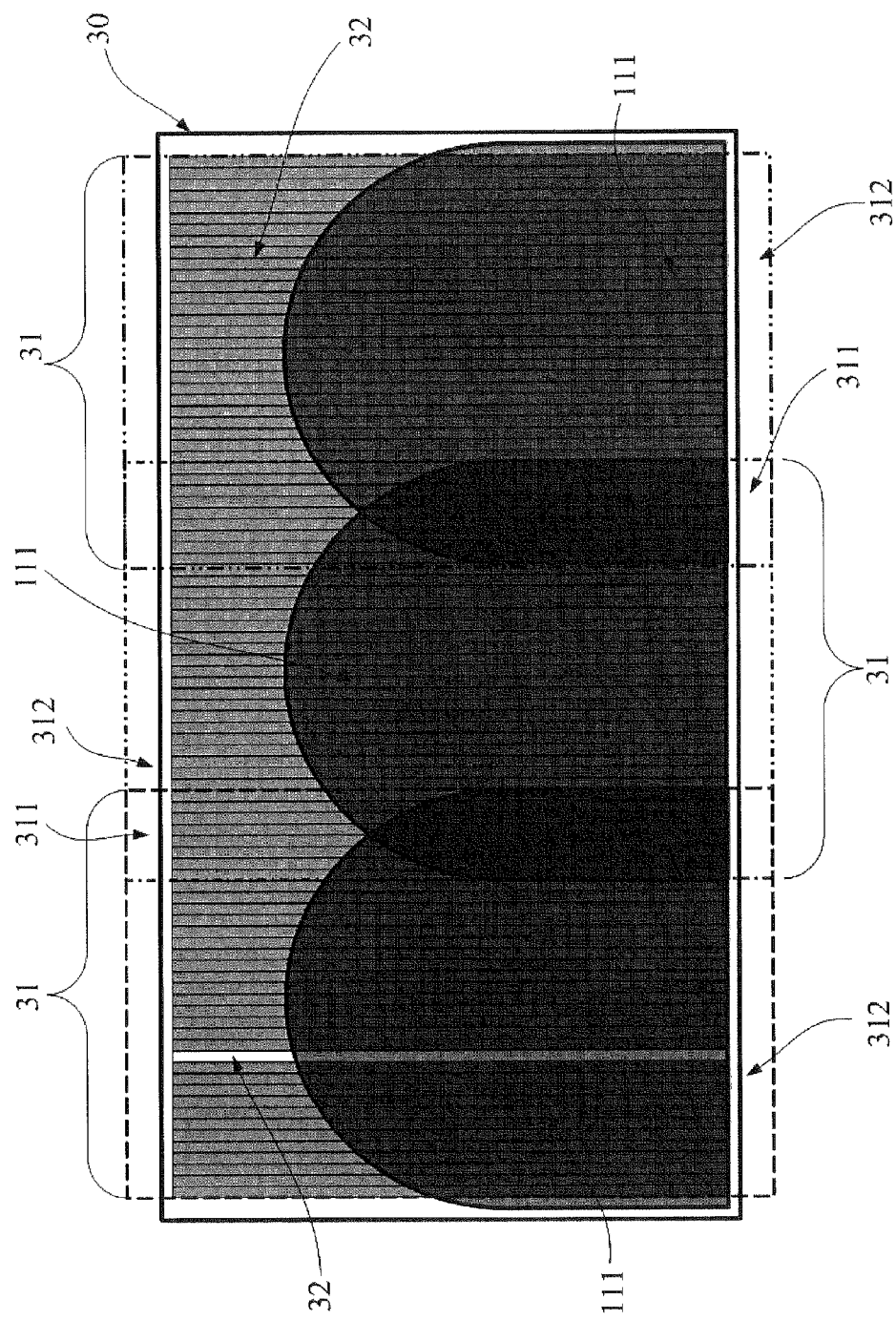
FIG. 6 is a schematic view of the slit array of the display system shown in FIG. 3.

FIG. 6 shows a schematic view of the slit array of the display system shown in FIG. 3. The slit array 30 of the display system 1 is optically coupled with the optical relaying device 20 so as to be illuminated by the rays 111 transmitted from the optical relaying device 20. The slit array 30 has a plurality of regions 31. The number of the regions 31 corresponds to the number of the light sources 11 of the projector 10, so the number of regions 31, in this example, is also three.

The regions 31 can be illuminated by the rays 111 respectively; that is, each of the rays 111 mainly impinges on one of the regions 31. The width of each of the regions 31 corresponds to the illumination range of the respective ray 111. When the number of the light sources 11 of the projector 10 increases, the range of each of the rays 111 impinging on the slit array 30 decreases relatively, so the slit array 30 is also divided into an increased number of regions 31.

Any two of the regions 31 can partially overlap each other, so each of the regions 31 can be further divided into an overlapping part 311 and a non-overlapping part 312; the overlapping part 311 is an edge part of the region 31.

Each of the regions 31 has a plurality of slits 32. In this embodiment, the three regions 31 have one hundred slits 32 in total. Because the regions 31 partially overlap each other, the regions 31 have some of the slits 32 in common. For example, the $25^{th}$ to the $35^{th}$ slits 32 are owned by the first and the second regions 31 in common.

Each of the slits 32 can be electrically turned on to allow a part of the rays 111 to pass therethrough. In this embodiment, the slit array 30 is preferably a liquid crystal panel, and each of the slits 32 is one row of liquid crystals (i.e. each of the slits 32 is made of one row of liquid crystals). The liquid crystals can allow specific rays to pass therethrough when being electrically energized.

Figure 7:
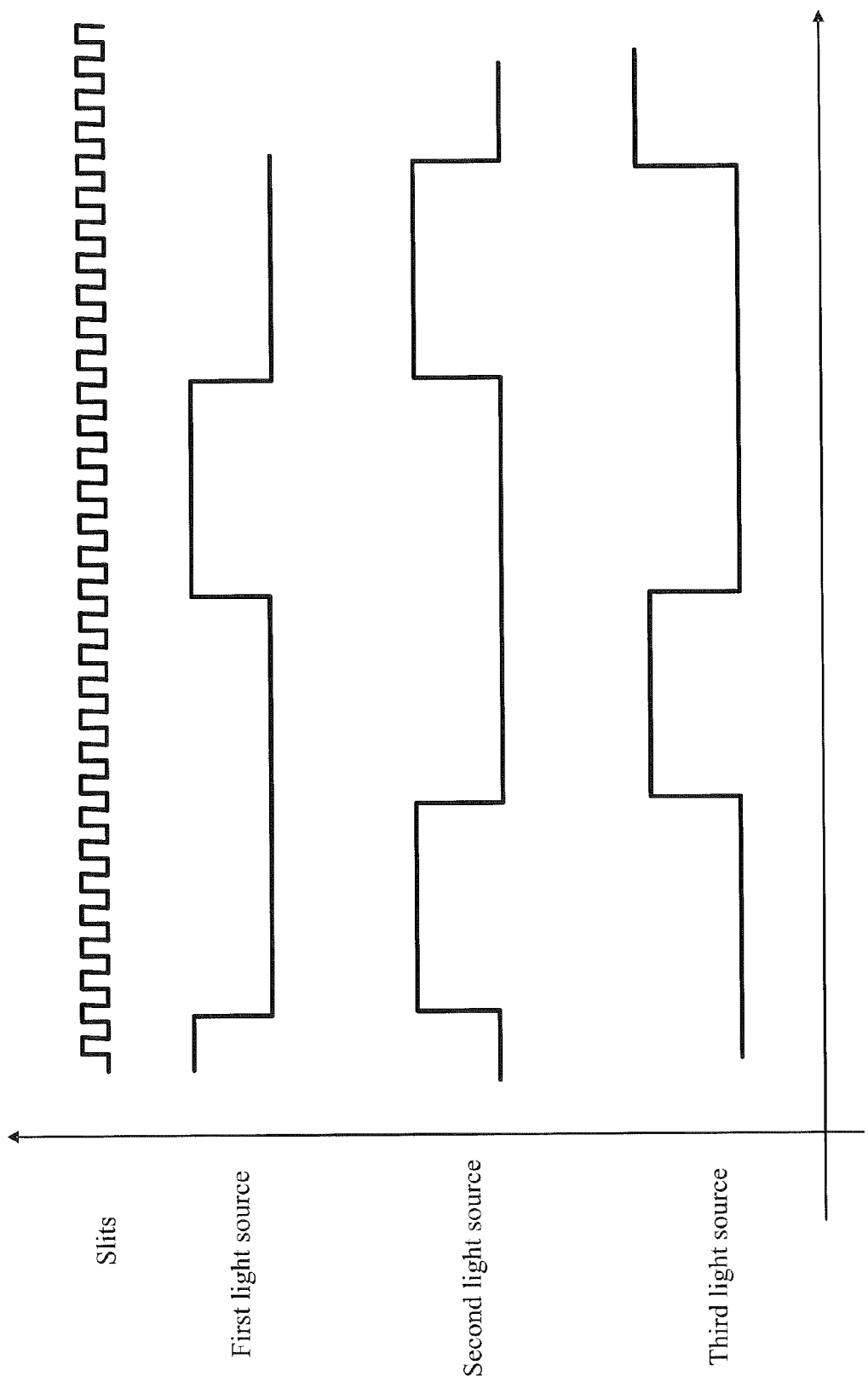
FIG. 7 is a schematic view illustrating the comparison between the turn-on periods of light sources and slits of the display system shown in FIG. 3.

The slits 32 are not turned on simultaneously but are turned on sequentially; that is, only one of the one hundred slits 32 is turned on each time. FIG. 7 shows a schematic view illustrating the comparison between the turn-on periods of the light sources and the slits of the display system shown in FIG. 3. The turn-on period of the slits 32 is inconsistent with the turn-on period of the light sources 11. Each of the light sources 11 has a first turn-on period, and each of the slits 32 has a second turn-on period which is smaller than the first turn-on period.

For example, if the display system 1 needs to output sixty 3D images within a second, then the first turn-on period is one one-hundred-and-eightieth (i.e. $\frac{1}{180}$) of a second while the second turn-on period is only one six-thousandth (i.e. $\frac{1}{6000}$) of a second. Each of the light sources 11 will be turned on in turn for one one-hundred-and-eightieth of a second while each of the slits 32 will be turned on in turn for one six-thousandth of a second.

Figure 1:
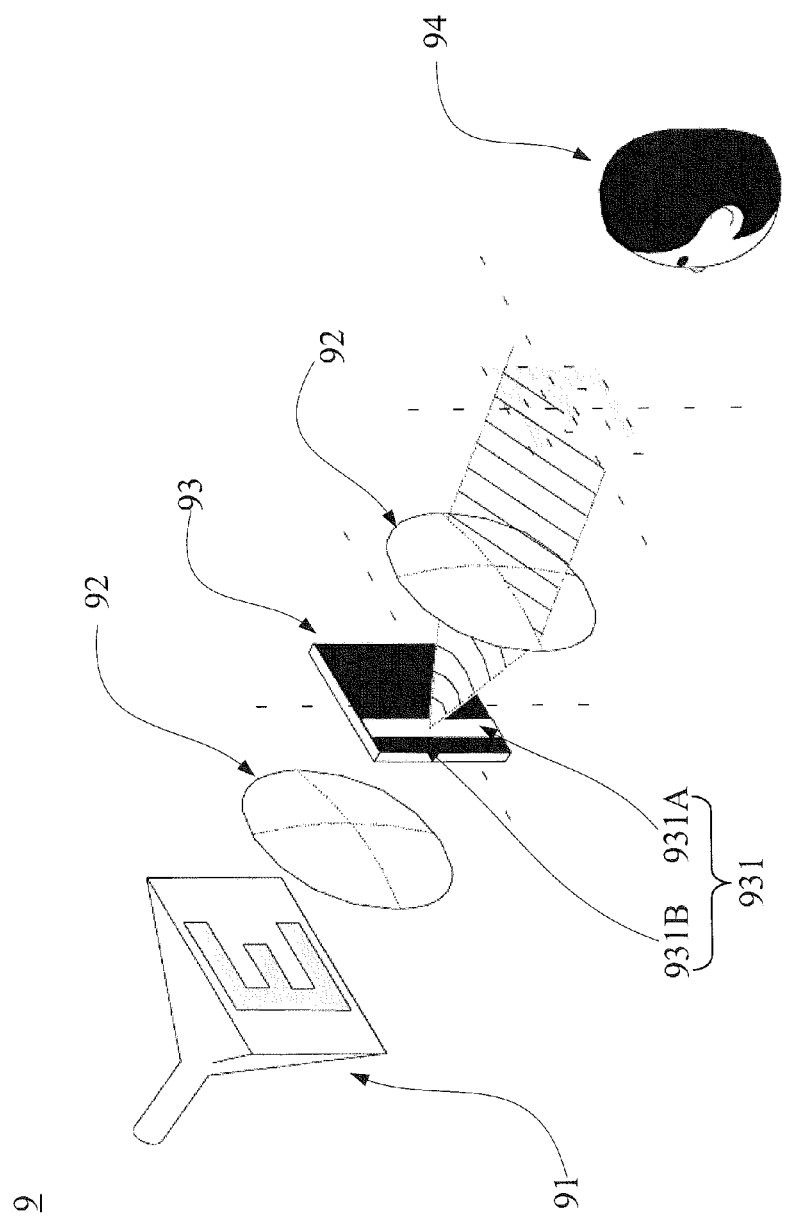
FIG. 1 is a schematic view of a system for time-multiplexed autostereoscopic display of the prior art.

Thus, the technical contents of the components of the display system 1 have been described above. As compared to the display system 9 (as shown in FIG. 1) of the prior art, the display system 1 can improve the shortcoming in which the 3D image outputted has an insufficient brightness. The reason is as follows: the projector 10 of the display system 1 allows only one of the light sources 11 to be turned on to generate a ray 111 impinging on the region 31 where the slits 32 are turned on, while the other two light sources 11 are not turned on; and therefore, when each 3D image is outputted, the ray 111 generated by at most one of the light sources 11 is blocked by the slit array 30 as a loss while the other two light sources 11 do not generate the rays 111 concurrently. Thus, light loss or waste can be avoided for the other two light sources 11.

When the number of the light sources 11 of the projector 10 increases, the light loss that results from the output of each 3D image decreases relatively. Thereby, the brightness of the 3D image outputted by the display system 1 can be increased correspondingly.

With reference to FIG. 6 again, when the rays 111 impinge on the regions 31 of the slit array 30, the brightness of the rays 111 is not distributed uniformly; and instead, the edge (corresponding to the non-overlapping part 312) of each of the rays has a brightness weaker than the center (corresponding to the overlapping part 311) of the ray. In other words, the distribution of the light sources 111 projected in the overlapping part 311 is lower than the distribution of light source 111 projected in the non-overlapping part 312.

Figure 8:
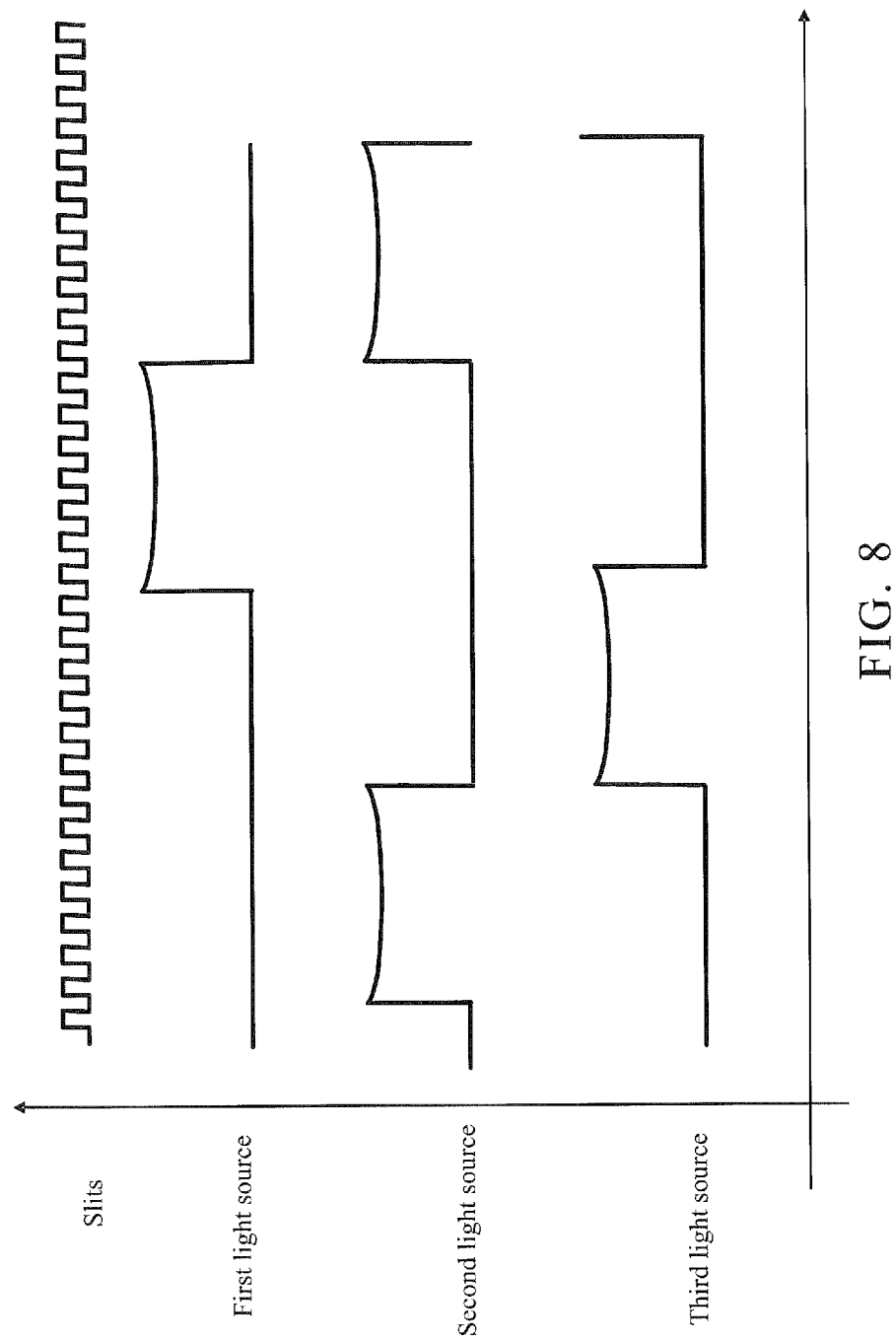
FIG. 8 is another schematic view illustrating the comparison between the turn-on periods of the light sources and the slits of the display system shown in FIG. 3.

FIG. 8 shows another schematic view illustrating the comparison between the turn-on periods of the light sources and the slits of the display system shown in FIG. 3. To compensate for the shortcoming that the brightness is distributed non-uniformly, the power of the light sources 11 will be increased to increase the brightness of the rays 111 when the slits 32 in the overlapping parts 311 of the regions 31 are turned on. In other words, the power of the light sources 11, when turned on, will decrease or increase with time, i.e., decrease or increase as the position of the turned-on slit 32 varies.

After compensation, the brightness of the rays 111 emitted from the slits 32 in the overlapping parts 311 and the brightness of the rays 111 emitted from the slits 32 in the non-overlapping parts 312 become relatively consistent with each other.

Figure 9:
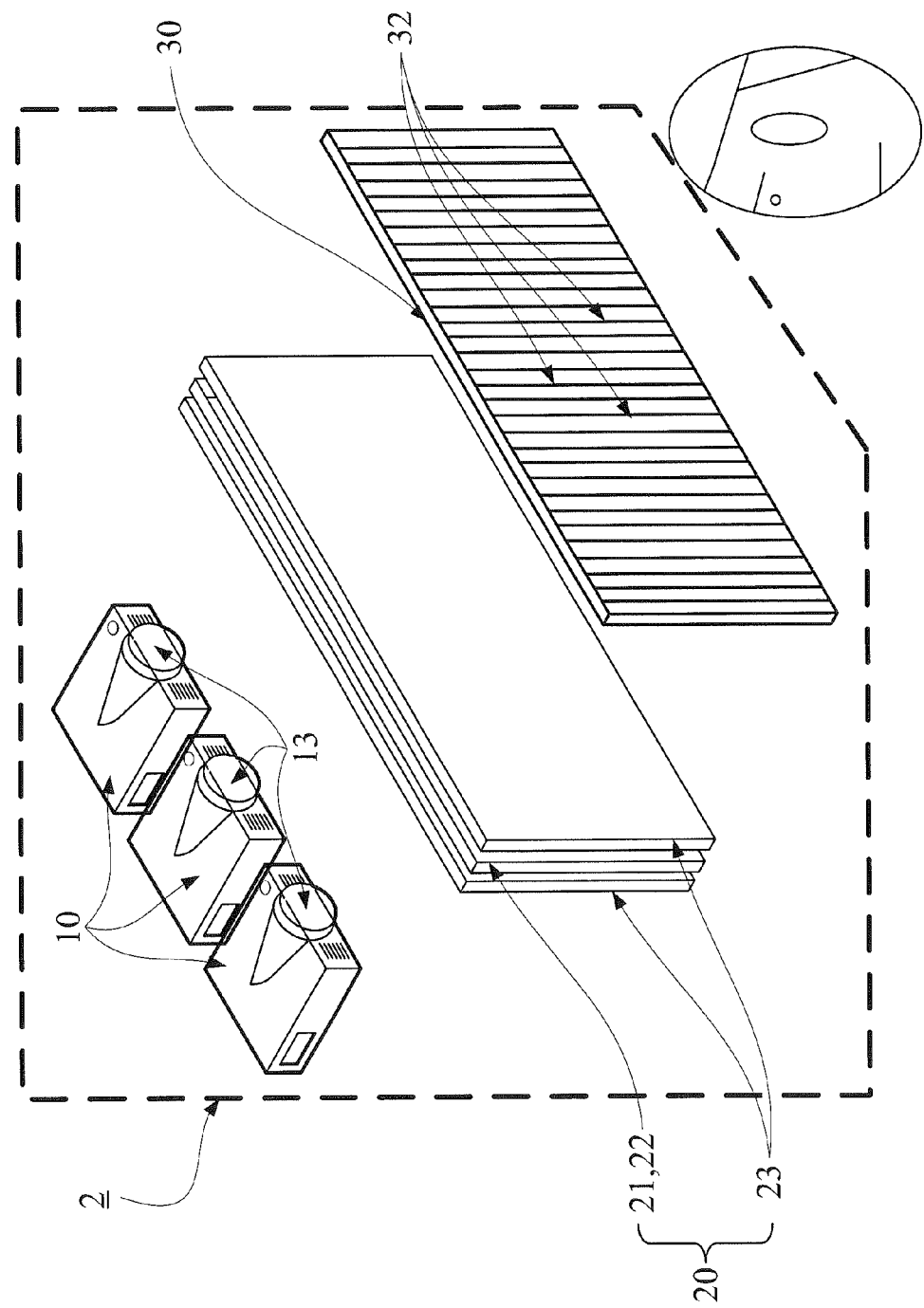
FIG. 9 is a schematic perspective view of a system for time-multiplexed autostereoscopic display according to the second embodiment of the present invention.
Figure 10:
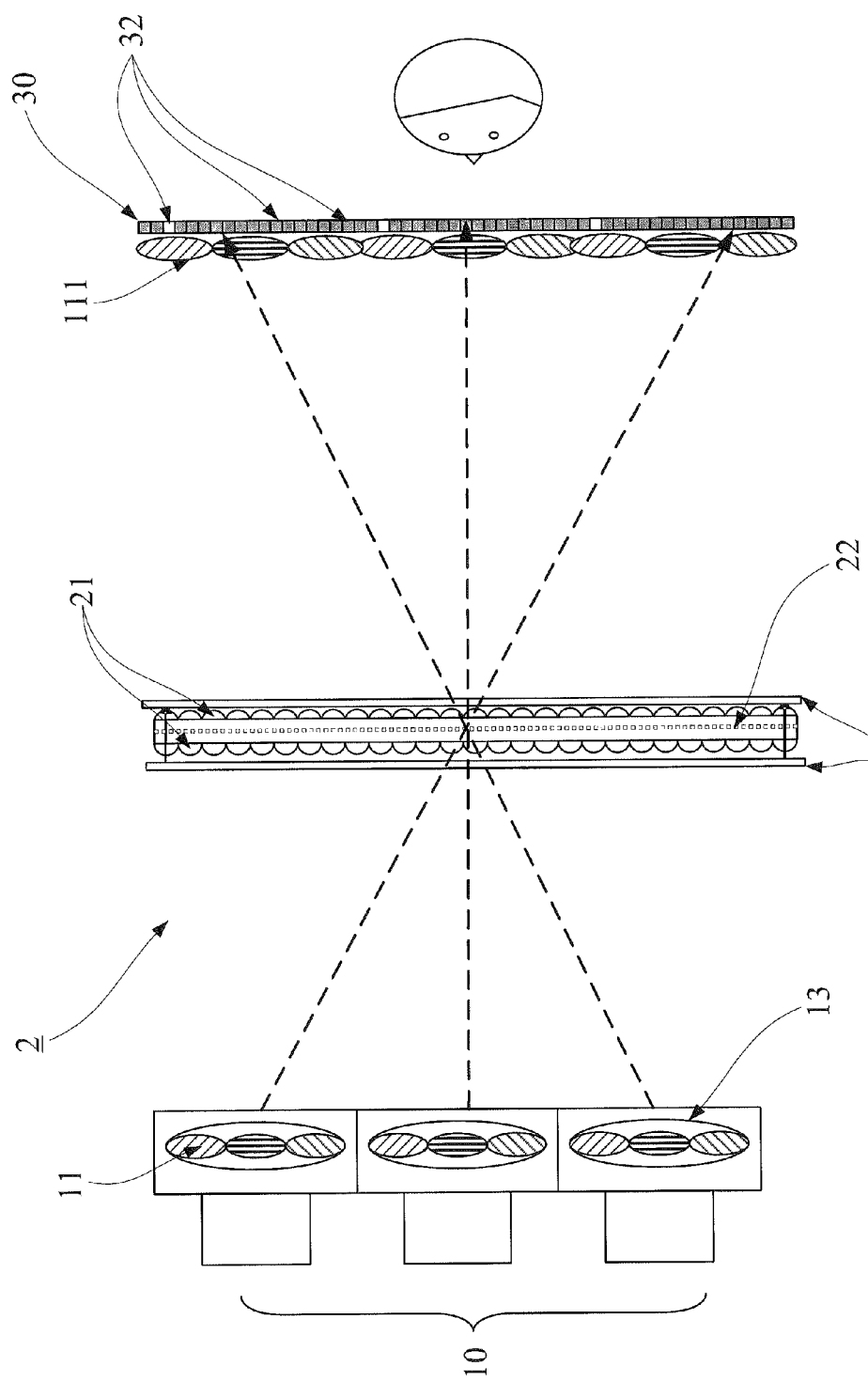
FIG. 10 is a schematic view of the system for time-multiplexed autostereoscopic display according to the second embodiment of the present invention.

FIGS. 9 and 10 show a schematic perspective view and a schematic plan view of a system for time-multiplexed autostereoscopic display according to the second embodiment of the present invention, respectively. In the second embodiment of the present invention, another system 2 for time-multiplexed autostereoscopic display is provided. The display system 2 differs from the display system 1 in that: the display system 2 comprises a plurality of projectors 10.

In this embodiment, three projectors 10 are illustrated as an example. Each of the projectors 10 has a plurality of light sources 11. In this embodiment, three light sources 11 are illustrated as an example. Thus, the display system 2 has nine light sources 11 in total, so there are nine rays 111 impinging on the slit array 30 correspondingly. In this embodiment, the slit array 30 has one hundred slits 32 in total.

Figure 11A:
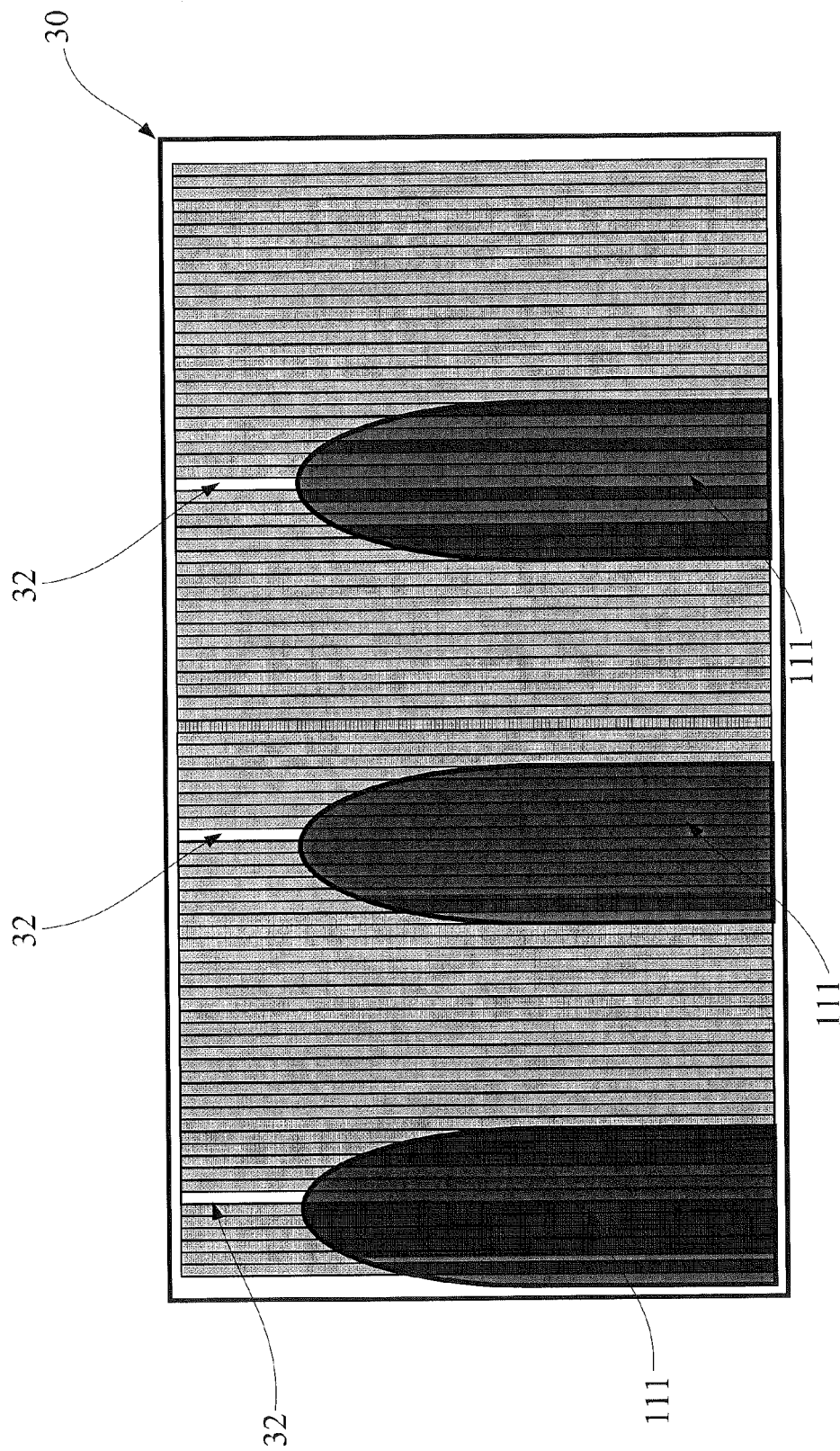
FIG. 11A is a schematic view illustrating the rays and slit array of the display system shown in FIG. 9 in the first time sequence.
Figure 11B:
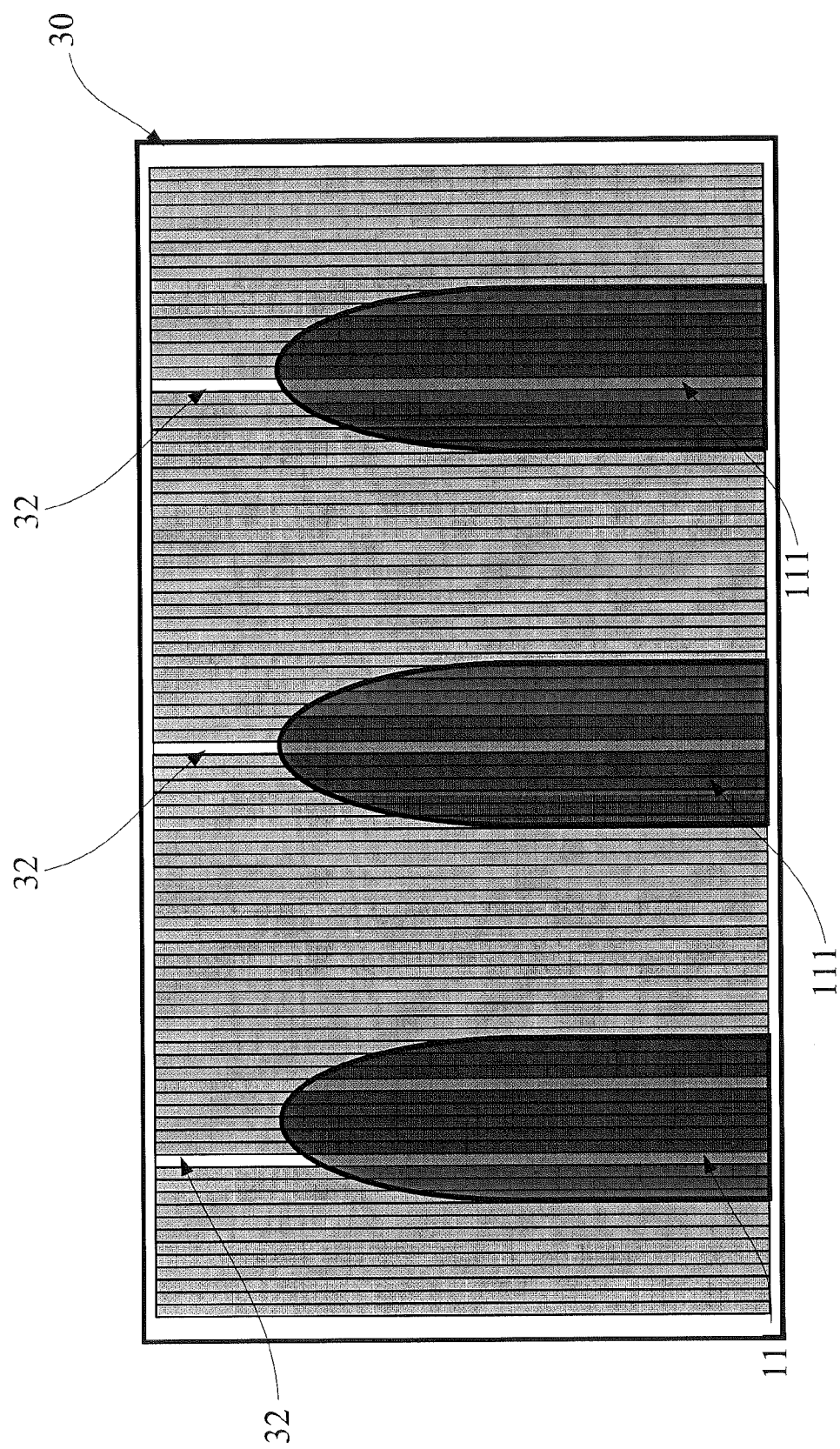
FIG. 11B is a schematic view illustrating the rays and slit array of the display system shown in FIG. 9 in the second time sequence.
Figure 11C:
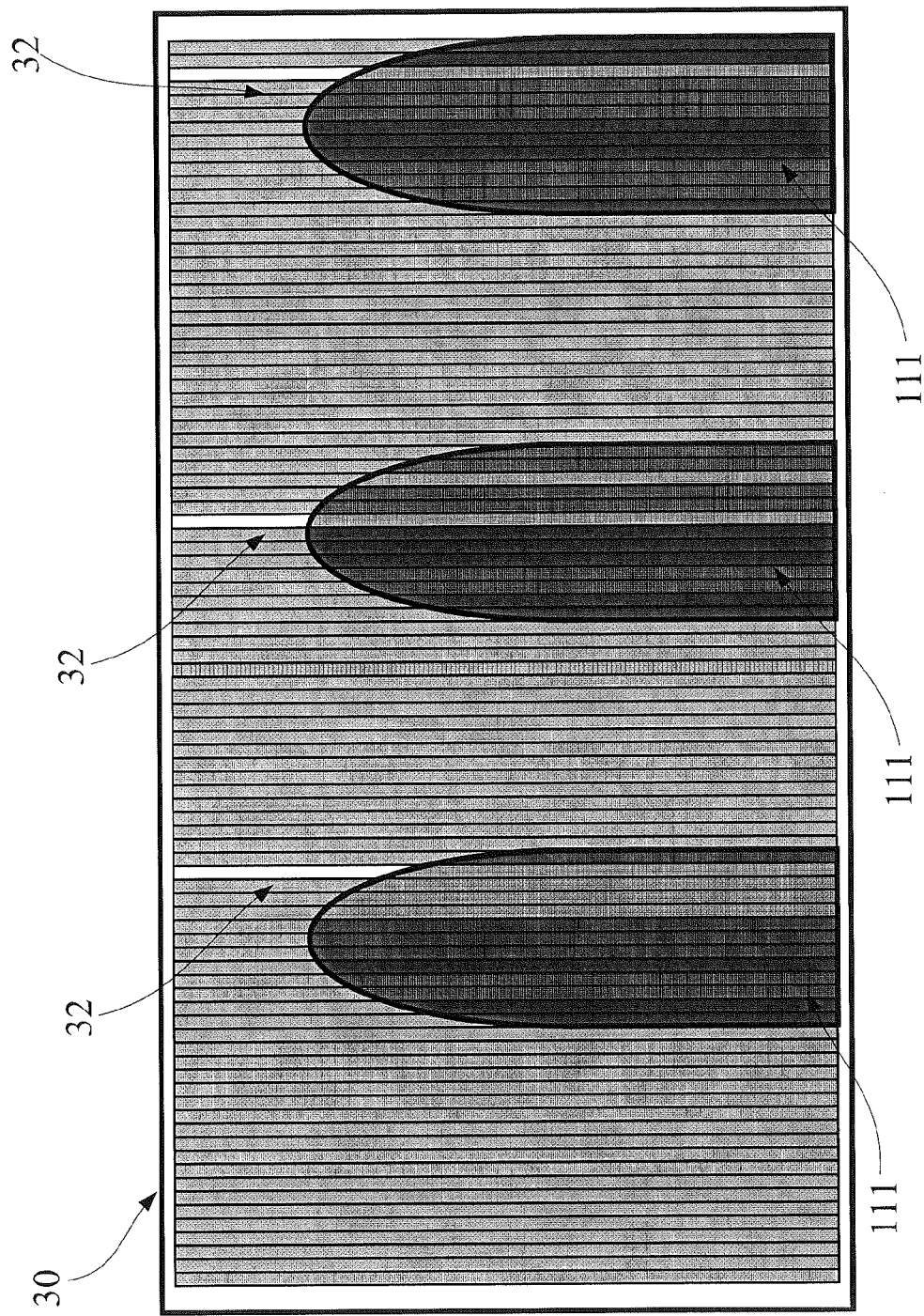
FIG. 11C is a schematic view illustrating the rays and the slit array of the display system shown in FIG. 9 in the third time sequence.

FIGS. 11A to 11C show schematic views illustrating the rays and the slit array of the display system shown in FIG. 9 in different time sequences. When the display system 2 operates, the light sources 11 of each of the projectors 10 are turned on sequentially. In the first time sequence, the first light source 11 of each of the projectors 10 is turned on to generate a ray 111 impinging on the slit array 30 (as shown in FIG. 11A). In a second time sequence, the second light source 11 of each of the projectors 10 is turned on to generate a ray 111 impinging on the slit array 30 (as shown in FIG. 11B). In a third time sequence, the third light source 11 of each of the projectors 10 is turned on to generate a ray 111 impinging on the slit array 30 (as shown in FIG. 11C).

In each time sequence, the three regions (not labeled) of the slit array 30 are illuminated by three rays 111 from the different projectors 10, and the slits 32 in these regions of the slit array 30 are turned on simultaneously to allow the rays 111 to pass therethrough respectively. Thus, in a time sequence, the display system 2 can output three of one hundred rays constituting a 3D image.

As compared to the conventional display system 9 (as shown in FIG. 1), the display system 2 can significantly reduce the "required frame rate". If the display system 2 needs to generate sixty 3D images within a second, then each of the projectors 10 only needs to generate two thousand images (rather than six thousand images) within a second and the turn-on period of each of the slits 32 only needs to be one two-thousandth second (rather than one six-thousandth second).

Figure 12:
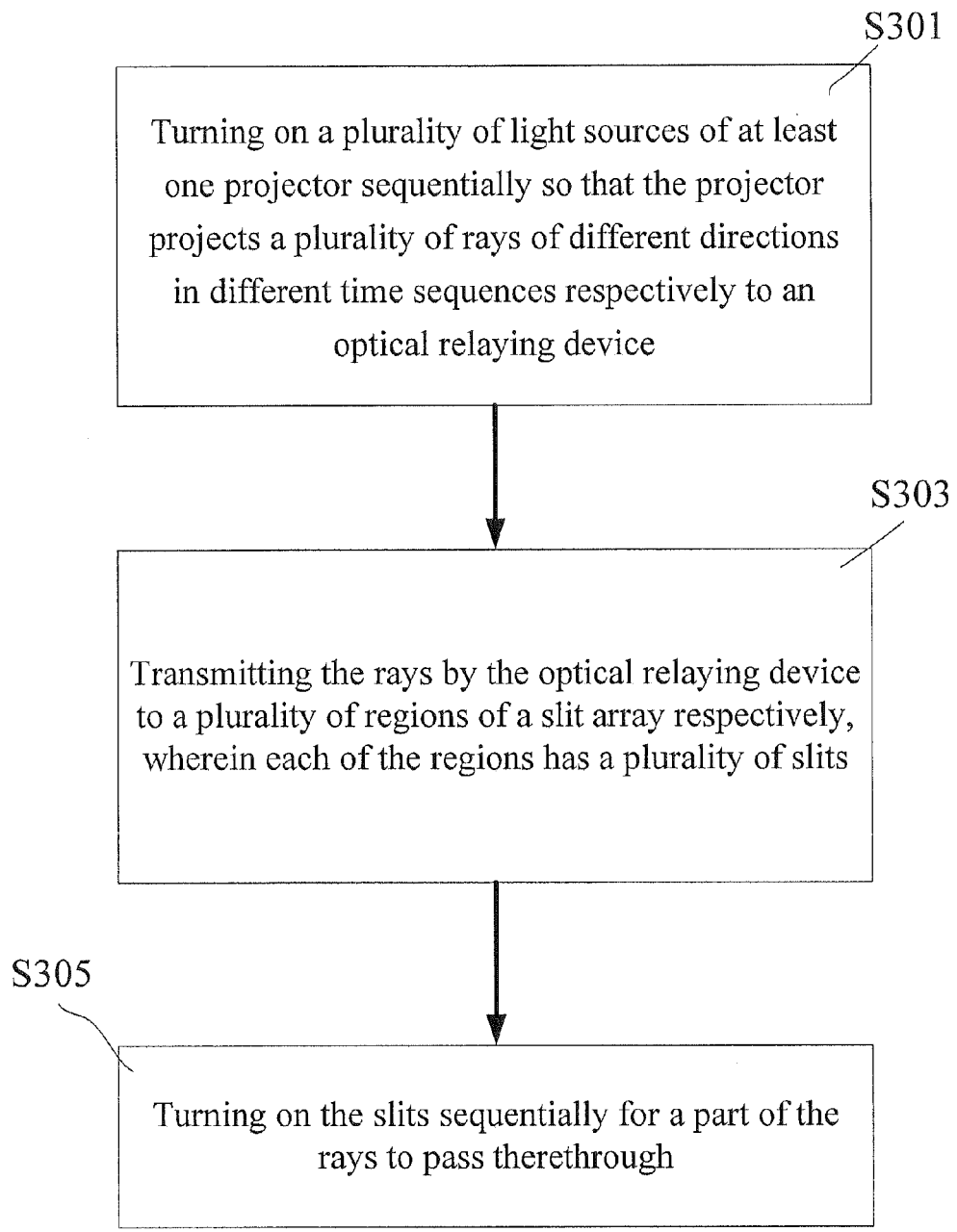
FIG. 12 is a schematic flowchart diagram of a method for time-multiplexed autostereoscopic display according to the third embodiment of the present invention.

FIG. 12 shows a schematic flowchart diagram of a method for time-multiplexed autostereoscopic display according to the third embodiment of the present invention. In the third embodiment of the present invention, a method for time-multiplexed autostereoscopic display is provided. For simplicity of description, the method for time-multiplexed autostereoscopic display will be referred to as "the display method," in the following description.

The display method can be applied in the system for time-multiplexed autostereoscopic display of the present invention, i.e., the aforesaid display systems 1 and 2 (as shown in FIG. 2 and FIG. 3). The display method may also be viewed as a method for operating the display system of the present invention, so reference may be made to the technical contents of the display system described above.

First, step S301 is executed to turn on a plurality of light sources of at least one projector (i.e., one or more projectors) sequentially so that the projector projects a plurality of rays of different directions in different time sequences respectively to an optical relaying device.

When the S301 is executed, the components of the projector may operate in the below steps for projecting the rays. Firstly, the light sources of the projector are turned on sequentially, and then the light sources produce the respective rays sequentially to an optical modulator of the projector in the different directions; secondly, the optical modulator transforms the rays into a plurality of images and transmits the images to a projection lens of the projector; then, the projection lens projects the rays to the optical relaying device.

Then, step S303 is executed to transmit the rays by the optical relaying device to a plurality of adjacent regions of a slit array respectively. Each of the regions has a plurality of slits. The number of light sources corresponds to the number of the regions.

While the rays are transmitted by the optical relaying device, the rays may undergo the below steps within the optical relaying device. Firstly, the rays are collimated by a first Fresnel lens of the optical relaying device; secondly, the rays from the first Fresnel lens are focused on a diffuser of the optical relaying device by a first lenticular lens of the optical relaying device; thirdly, the rays from the diffuser are focused onto a second Fresnel lens of the optical relaying device by a second lenticular lens of the optical relaying device; then, the rays are collimated and transmitted onto the slit array by the second Fresnel lens.

Next, step S305 is executed to turn on the slits sequentially for a part of the rays to pass therethrough. Each of the light sources has a first turn-on period, and each of the slits has a second turn-on period which is smaller than the first turn-on period.

Through the execution of the aforesaid steps, the display method can generate a 3D virtual image. In addition, any two of the regions of the slit array can partially overlap each other so that each of the regions is divided into an overlapping part and a non-overlapping part. The display method increases the power of the light sources when the slits in the overlapping parts of the regions are turned on.

According to the above descriptions, the system and method for time-multiplexed autostereoscopic display of the present invention can reduce the light loss caused when an overall ray generated by the projector is blocked by the slit array, so the 3D image outputted has an increased brightness. In addition, the system and method for time-multiplexed autostereoscopic display of the present invention can reduce the required frame rate.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A system for time-multiplexed autostereoscopic display, comprising:
   at least one projector, having a plurality of light sources, wherein the light sources are adapted to be turned on sequentially so that the projector projects a plurality of rays of different directions in different time sequences respectively;
   an optical relaying device, optically coupled with the projector for relaying the rays; and
   a slit array, optically coupled with the optical relaying device so as to be illuminated by the rays, wherein the slit array has a plurality of regions which are illuminated by the rays respectively, and each of the regions has a plurality of slits which are turned on sequentially for a part of the rays to pass therethrough, wherein a number of the light sources corresponds to a number of the regions;
   wherein, each of the light sources has a first turn-on period, and each of the slits has a second turn-on period which is smaller than the first turn-on period.

2. The system of claim 1, wherein any two adjacent regions partially overlap each other so that each of the regions is divided into an overlapping part and a non-overlapping part, and the distribution of the light sources projected in the overlapping part is lower than the distribution of light source projected in the non-overlapping part.

3. The system of claim 2, wherein power of the light sources is increased when the slits in the overlapping parts of the regions are turned on.

4. The system of claim 1, wherein the projector further has an optical modulator and a projection lens, the optical modulator is optically coupled with the light sources and the projection lens, the light sources are adapted to produce the respective rays sequentially, the rays impinge on the optical modulator in different directions, the optical modulator is adapted to transform the rays into a plurality of images and then transmit the images to the projection lens, and the projection lens is adapted to project the rays.

5. The system of claim 4, wherein the optical modulator is a DMD or an LCoS.

6. The system of claim 1, wherein the optical relaying device has two lenticular lens sheets and a diffuser which is disposed between the two lenticular lens sheets.

7. The system of claim 6, wherein the optical relaying device further has two Fresnel lenses, and the two lenticular lens sheets are disposed between the two Fresnel lenses.

8. The system of claim 1, wherein the slit array is a liquid crystal panel, and each of the slits is one row of liquid crystals.

9. A method for time-multiplexed autostereoscopic display, comprising:
   turning on a plurality of light sources of at least one projector sequentially so that the projector projects a plurality of rays of different directions in different time sequences respectively to an optical relaying device;
   transmitting the rays by the optical relaying device to a plurality of regions of a slit array respectively, wherein each of the regions has a plurality of slits; and
   turning on the slits sequentially for a part of the rays to pass therethrough, wherein a number of the light sources corresponds to a number of the regions;
   wherein, each of the light sources has a first turn-on period, and each of the slits has a second turn-on period which is smaller than the first turn-on period.

10. The method of claim 9, wherein any two of the regions partially overlap each other so that each of the regions is divided into an overlapping part and a non-overlapping part; and when the slits in the overlapping parts of the regions are turned on, power of the light sources is increased.

11. The method of claim 9, wherein when the light sources of the projector are turned on to sequentially, the light sources produce the respective rays sequentially to an optical modulator of the projector in the different directions, then the optical modulator transforms the rays into a plurality of images and transmits the images to a projection lens of the projector, and then the projection lens projects the rays.

12. The method of claim 9, while the rays are transmitted by the optical relaying device, the rays are collimated by a first Fresnel lens of the optical relaying device, then focused on a diffuser of the optical relaying device by a first lenticular lens of the optical relaying device, then focused onto a second Fresnel lens of the optical relaying device by a second lenticular lens of the optical relaying device, and then collimated and transmitted onto the slit array by the second Fresnel lens.

* * * * *